United States Patent [19]
Klein

[11] Patent Number: 6,108,732
[45] Date of Patent: Aug. 22, 2000

[54] METHOD FOR SWAPPING, ADDING OR REMOVING A PROCESSOR IN AN OPERATING COMPUTER SYSTEM

[75] Inventor: Dean A. Klein, Eagle, Id.

[73] Assignee: Micron Electronics, Inc., Nampa, Id.

[21] Appl. No.: 09/050,475

[22] Filed: Mar. 30, 1998

[51] Int. Cl.[7] ........................................ G06F 13/00
[52] U.S. Cl. ............................ 710/103; 714/15
[58] Field of Search ........................ 710/103, 102, 710/104; 741/10, 13, 15, 23, 24

[56] References Cited

U.S. PATENT DOCUMENTS

| | | |
|---|---|---|
| 5,295,258 | 3/1994 | Jewett et al. . |
| 5,551,043 | 8/1996 | Crump et al. . |
| 5,581,712 | 12/1996 | Herrmann ............................ 710/103 |
| 5,715,464 | 2/1998 | Crump et al. . |
| 5,748,877 | 5/1998 | Dollahite et al. . |
| 5,748,912 | 5/1998 | Lee ...................................... 710/103 |
| 5,758,174 | 5/1998 | Crump et al. . |
| 5,838,929 | 11/1998 | Tanikawa ............................ 710/103 |
| 5,845,060 | 12/1998 | Vrba et al. . |
| 5,889,965 | 3/1999 | Wallach et al. ...................... 710/103 |
| 5,964,855 | 10/1999 | Bass et al. ........................... 710/103 |

*Primary Examiner*—Glenn A. Auve
*Attorney, Agent, or Firm*—Park & Vaughan LLP

[57] ABSTRACT

One embodiment of the present invention provides a method for preparing a computer system for removal of a processor module from the computer system while the computer system is operating. This method includes receiving a command to prepare the computer system for removal of the processor module, and saving state from the processor module to a first location in the computer system. In response to this command, the method modifies parameters of an operating system in the computer system so that the computer system will continue to function without the processor module. The method also removes power from the processor module while maintaining power to other parts of the computer system. Thus, this embodiment of the present invention allows the processor module to removed, replaced and reinitialized without shutting down the computer system.

19 Claims, 4 Drawing Sheets

006,108,732

METHOD FOR SWAPPING, ADDING OR REMOVING A PROCESSOR IN AN OPERATING COMPUTER SYSTEM

RELATED APPLICATION

The subject matter of this application is related to the subject matter in U.S. patent application Ser. No. 09/050,338, filed Mar. 30, 1998, pending.

BACKGROUND

1. Field of the Invention

The present invention relates to fault tolerance in computer systems, and more particularly to a method for swapping, removing or adding processors in a computer system while the computer system continues operating.

2. Related Art

Continuous operation and high reliability are essential for some computer systems. A failure, or even a temporary cessation of operation, can have catastrophic consequences for electronic fund transfer systems or airline traffic control systems, for example. To this end people have developed fault-tolerant computing systems that allow "hot swapping" of computer system components. Hot swapping involves removing and replacing a failed computer system component while the computer system continues to operate. This potentially allows a computer system with a failed component to be repaired without shutting the computer system down.

Hot swapping is typically applied to devices that plug into a computer system's peripheral bus, such as a disk drive. This allows peripheral devices to be replaced, without shutting the computer system down. However, more centrally located components, such central processing units (CPUs) cannot be replaced in this way. This is because most computer systems are uniprocessor systems with only one central processing unit. Hence, removing the central processing unit will prevent the computer system from functioning. Furthermore, CPUs are typically deeply integrated into the motherboard, or center of a computer system, and cannot easily be removed. Additionally, CPUs are harder to initialize, and are more tightly bound into the computer system's operating system and interrupt structure than are peripheral devices, such as disk drives. Consequently, it is a much harder to facilitate removal and re-insertion of a CPU in an operating computer system.

Consequently, when central processing units fail or need to be upgraded for additional performance, a computer system must be shut down to replace the CPU. Furthermore, in order to restart the computer system a lengthy rebooting process is typically required to re-initialize the operating system and other computer system components.

What is needed is a computer system that allows a CPU to be removed without shutting the computer system down.

Additionally, what is needed is a computer system that allows a CPU to be inserted and initialized while the computer system is operating.

SUMMARY

One embodiment of the present invention provides a method for preparing a computer system for removal of a processor module from the computer system while the computer system is operating. This method includes receiving a command to prepare the computer system for removal of the processor module, and saving state from the processor module to a first location in the computer system. In response to this command, the method modifies parameters of an operating system in the computer system so that the computer system will continue to function without the processor module. The method also removes power from the processor module while maintaining power to other parts of the computer system.

Another embodiment of the present invention includes isolating electrical pathways between the processor module and the computer system.

Another embodiment of the present invention includes modifying an interrupt structure in the computer system so that the processor module will not receive interrupts. A variation on this embodiment includes modifying the interrupt structure so that interrupts are redirected to another processor in the computer system.

Another embodiment of the present invention includes waiting for a bus transaction involving the processor module to complete. Yet another embodiment includes waiting for a computational task involving the processor module to complete.

Another embodiment of the present invention includes overwriting boot code in the computer system with code that restores the state from the first location in the computer system.

In one embodiment of the present invention, receiving the command to prepare the computer system for removal of the processor module includes receiving a command from a switch. In a variation on this embodiment, it includes receiving a command from a computer program. In yet another variation, it includes receiving a command from a computer system resource that detects a problem in the processor module.

In one embodiment of the present invention, saving state from the processor module to a first location in the computer system includes saving values stored in processor registers. In another embodiment, it includes saving values from a processor cache on the processor module. In a further embodiment, it includes saving state from the processor to another processor in the computer system. In yet a further embodiment, it includes saving state from the processor to a storage area in the computer system.

DEFINITIONS

Computational Task—a unit of work performed by a central processing unit in a computer system. A task may include from one to many thousands of processor instructions.

Processor Module—a removable assembly in a computer system containing a processor. This may include a processor card, a microprocessor chip, and/or a processor carrier.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

DESCRIPTION OF COMPUTER SYSTEM

Figure 1:
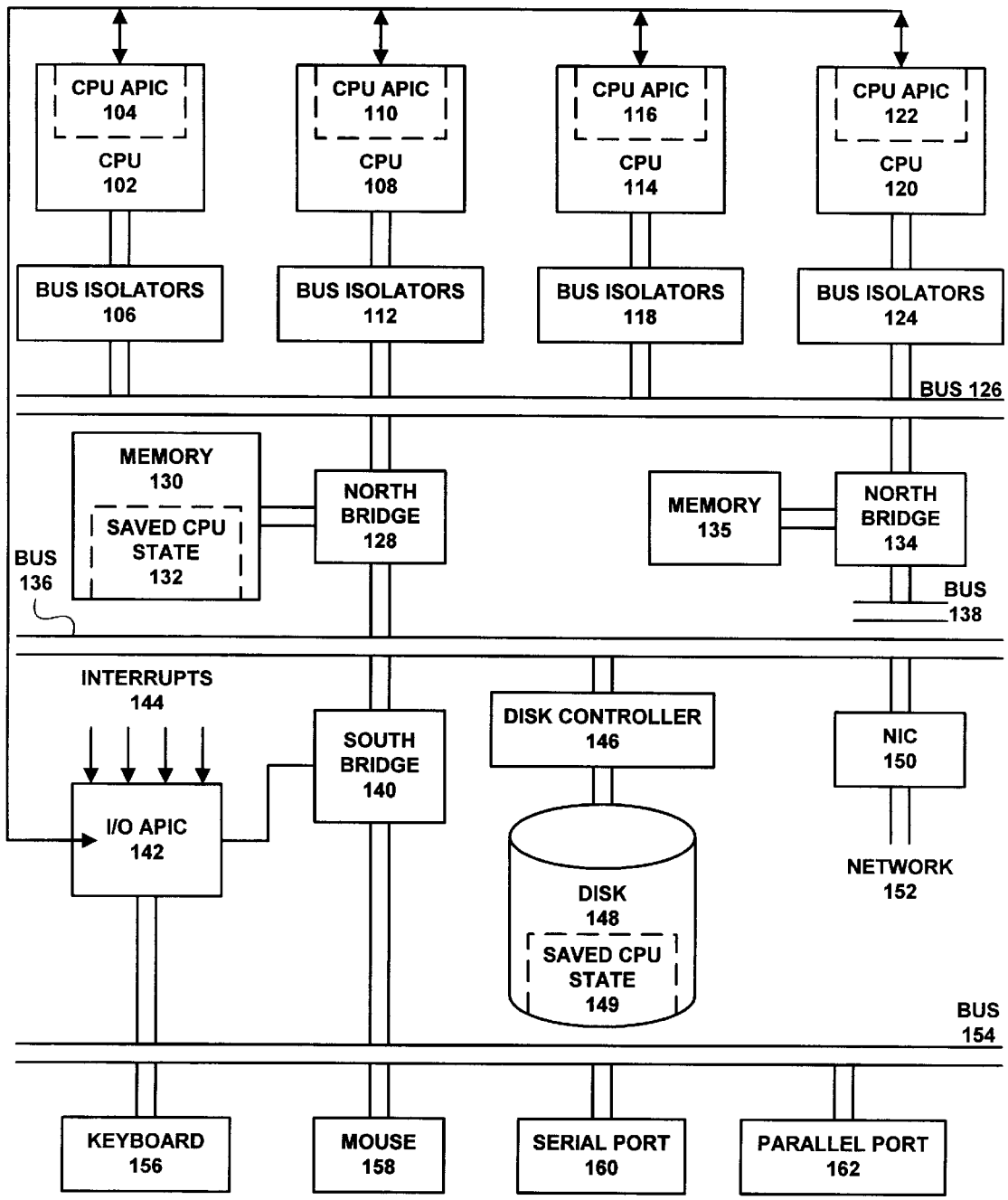
FIG. 1 illustrates some of the functional components of a computer system, which provides for replacement of CPU modules while the computer system is running, in accordance with an embodiment of the present invention.

FIG. 1 illustrates some of the functional components of a computer system, which provides for replacement of CPU modules while the computer system is running, in accordance with an embodiment of the present invention. In this embodiment, the computer system includes multiple central processing units (CPUs) 102, 108, 114 and 120. CPUs 102, 108, 114 and 120 may be any type of computational engine in a computer system, including, but not limited to, mainframe central processing units, microprocessors or device controllers. CPUs 102, 108, 114 and 120 are coupled to bus 126 through bus isolators 106, 112, 118 and 124. Bus 126 may be any type of bus used to coupled processors to other parts of the computer system. In one embodiment, bus 126 is a P6 bus specified by the Intel Corporation of Sunnyvale Calif. Bus isolators 106, 112, 118 and 124 provide a mechanism to selectively decouple signal lines from bus 126 to CPUs 102, 108, 114 and 120. In one embodiment, bus isolators 106, 112, 118 and 124 are implemented with pass transistors.

Bus 126 is coupled to north bridges 128 and 134. North bridge 128 includes circuitry to couple CPUs (102, 108, 114 and 120) to memory 130 and to bus 136. North bridge 134 includes circuitry to couple CPUs (102, 108, 114 and 120) to memory 135 and to bus 138. Memories 130 and 135 may be any type of memories usable to store code and data in the computer system. Memory 130 contains saved CPU state 132, which is state saved from one of CPUs 102, 108, 114 and 120, before the CPU is removed from the computer system. In one embodiment of the present invention, saved CPU state 132 includes the contents of the CPU's registers. Buses 136 and 138 may be any type of bus used to couple components of a computer system together. In one embodiment, buses 136 and 138 are PCI buses.

In the illustrated embodiment, bus 136 couples north bridge 128 to south bridge 140, disk controller 146 and NIC 150. Bus 138 has similar connections, which are not shown. Disk controller 146 couples disk 148 to the computer system. Disk 148 may be any type of mass storage device. This includes, but is not limited to, optical, magnetic and electronic devices for storing code and data. Disk 148 additionally includes saved CPU state 149. This allows state saved from a CPU to be stored on disk 148 as an alternative to storing it in memory 130. NIC (network interface controller) 150 couples the computer system to network 152, which may be any type of local area or wide area network communicating with the computer system.

South bridge 140 may be any type of logic used to couple bus 136 to bus 154. Bus 154 includes any type of bus that can be used to couple computer system components together. In one embodiment, this includes an ISA peripheral bus. In the illustrated embodiment, bus 154 couples the computer system to a number of peripheral devices and assorted ports, including, advanced programmable interrupt controller (APIC) 142, keyboard 156, mouse 158, serial port 160 and parallel port 162.

APIC 142 may be any type of programmable interrupt controller in a computer system. In the illustrated embodiment, APIC 142 receives a plurality of interrupt lines 144, and communicates with corresponding CPU APICs 104, 110, 116 and 122 within CPUs 102, 108, 114 and 120, respectively. APIC 142 includes an additional connection to south bridge 140. During operation, APIC 142 receives the plurality of interrupts 144 and directs them to CPUs 102, 108, 114 and 120 for processing. In the event one of CPUs 102, 108, 114 and 120 is removed, CPU APIC 142 allows interrupts to be directed to the remaining CPUs in the system.

DESCRIPTION OF CONNECTOR

Figure 2:
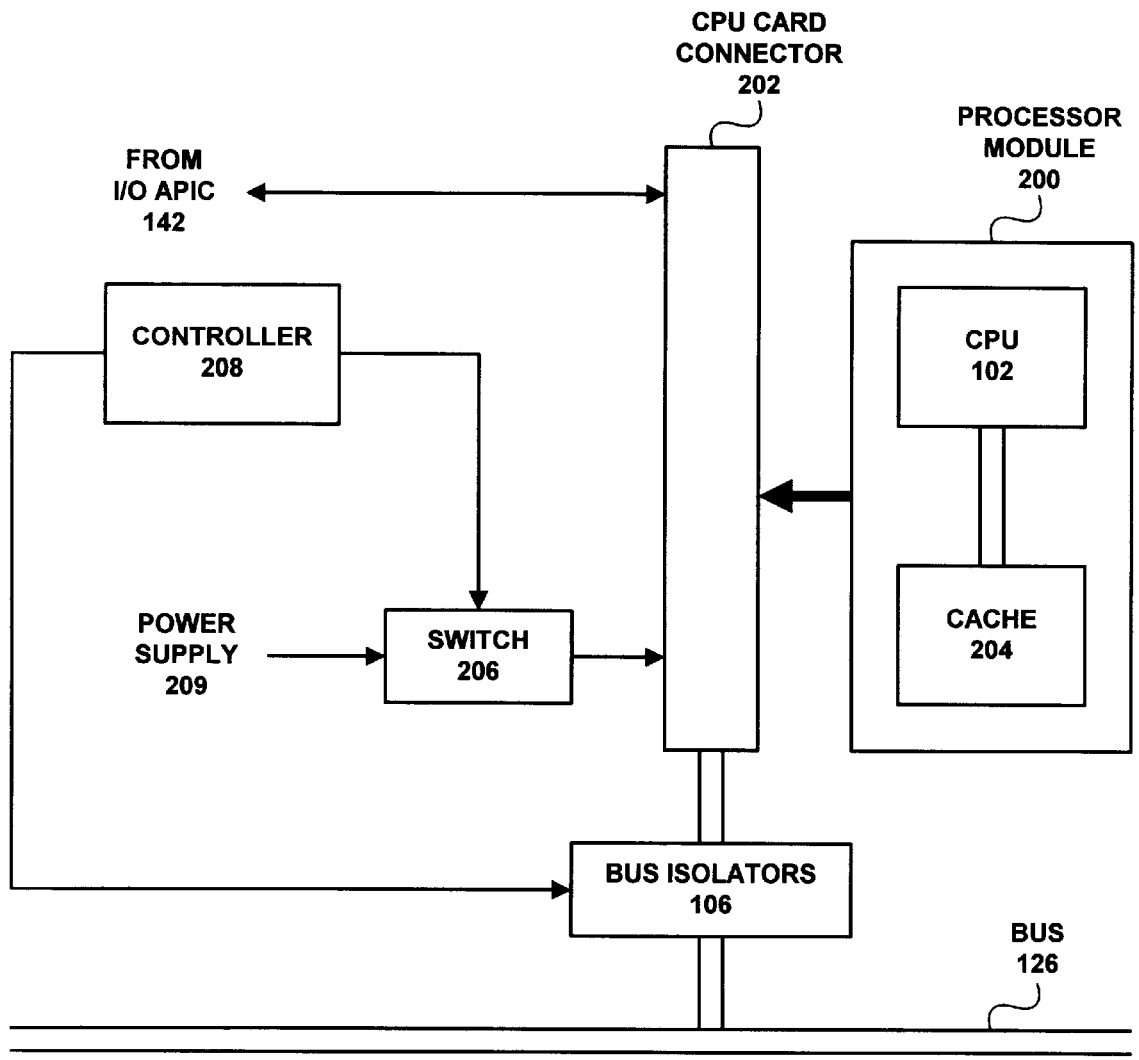
FIG. 2 illustrates some of the functional components of a connector 202 for receiving a processor module 200 in accordance with an embodiment of the present invention.

FIG. 2 illustrates some of the functional components of a connector 202 for receiving a processor module 200 in accordance with an embodiment of the present invention. CPU card connector 202 is configured and disposed to receive processor module 200. Connector 202 additionally includes signal line connectors for coupling signal lines from processor module 200 to the computer system. In one embodiment, connector 202 is in the form of a bus slot and processor module 200 is in the form of a bus card. Processor module 200 may be any type of module containing a processing engine. In the illustrated embodiment, processor module 200 includes CPU 102 (from FIG. 1) and cache 204. These are coupled through connector 202 and bus isolators 106 (from FIG. 1) to bus 126 (from FIG. 1). Connector 202 additionally includes lines from power supply 209, which are channeled into connector 202 through switch 206. Connector 202 also receives signals from I/O APIC 142, which feed into CPU APIC 104 within CPU 102 (this is shown in FIG. 1, but not in FIG. 2). Switch 206 and bus isolators 106 are controlled by controller 208. Controller 208 causes switch 206 and bus isolators 106 to selectively apply power and signal line connections to processor module 200.

During operation, when processor module 200 is to be removed from the system, controller 208 causes switch 206 to remove power from processor module 200. It also causes bus isolators 106 to remove signal connections from processor module 200. When a new processor module is inserted into the computer system, controller 208 causes switch 206 and bus isolators 106 to restore power and signal connections to processor module 200.

DESCRIPTION OF PREPARATION FOR REMOVAL OF PROCESSOR MODULE

Figure 3:
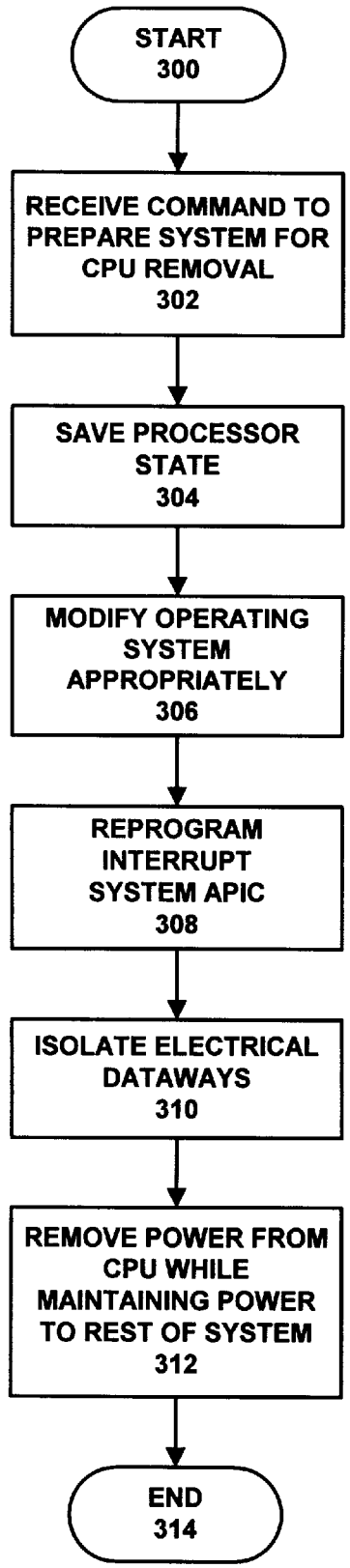
FIG. 3 is a flow chart illustrating some of the operations involved in preparing a computer system for removal of processor module 200 in accordance with an embodiment of the present invention.

FIG. 3 is a flow chart illustrating some of the operations involved in preparing a computer system for removal of a processor module in accordance with an embodiment of the present invention. By way of example, suppose processor module 200 from FIG. 2 is to be removed. The system starts in state 300 and proceeds to state 302. In state 302, the system receives a command to prepare the system for removal of processor module 200. In one embodiment, this command is received from a switch. In another embodiment, this command is received from a computer program. In yet another embodiment, this command is received from a mechanism within the computer system that detects a problem with the processor module and in sends a command to prepare the computer system for removal of processor module 200.

The system next proceeds to state 304. In state 304, the system saves state from processor module 200. In one embodiment, this state includes the contents of processor registers. This state may be saved to a variety of locations. In one embodiment, this state is saved to a memory in the computer system, such as memory 130 in FIG. 1. In another embodiment, this state is saved to a mass storage device, such as disk 148 in FIG. 1. In yet another embodiment, this state is saved to another processor in the computer system. Another embodiment of the present invention additionally waits for a computational task or a bus transaction involving processor module 200 to complete before proceeding to state 304.

The system next proceeds to state 306. In state 306, the operating system of the computer system is modified appropriately so that the computer system can continue to function without processor module 200. Computational tasks in the run queue that would normally be allocated to processor module 200 are be redirected to other processor modules.

The system next proceeds to state 308. In state 308, APIC 142 is reprogrammed so that processor module 200 will not receive interrupts. In a variation on this embodiment, the interrupts directed to processor module 200 are redirected to other processor modules in the computer system.

The system next proceeds to state 310. In state 310, controller 208 from FIG. 2 causes the computer system to isolate electrical pathways between processor module 200 and the computer system by activating bus isolators 106. The system next proceeds to state 312. In state 312, controller 208 causes switch 206 to deactivate power from processor module 200 while maintaining power to the rest of the computer system. The system next proceeds to state 314, which is an end state.

In another embodiment of the present invention, the computer system additionally stores reboot code for processor module 200 into a location within memory 130. This saves on subsequent reboot time because the reboot code will not have to be copied from ROM to RAM in order for a new processor module in connector 202 to be rebooted. In one embodiment, this reboot code includes instructions to restore state to processor module 200.

DESCRIPTION OF OPERATIONS AFTER INSERTION OF A PROCESSOR MODULE

Figure 4:
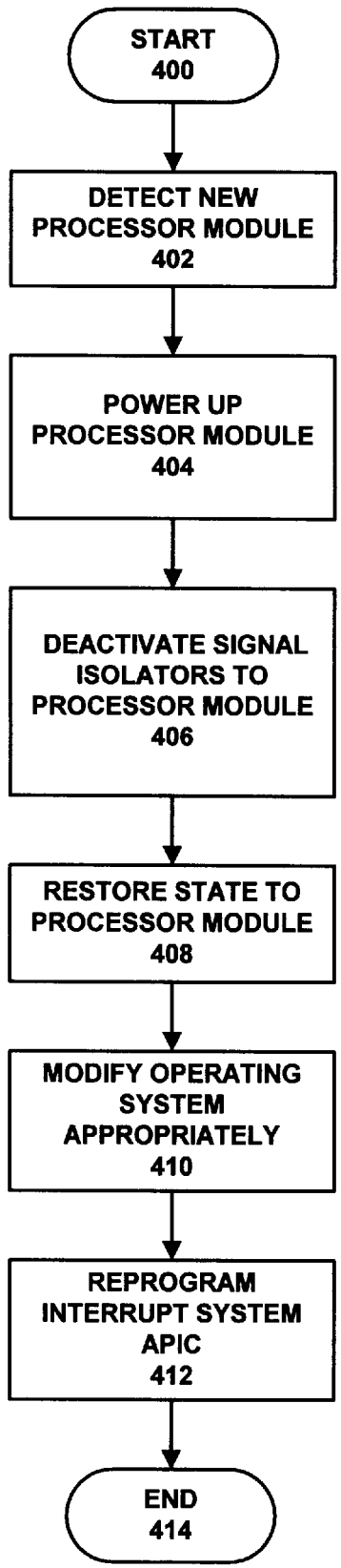
FIG. 4 is a flow chart illustrating some of the operations involved in making operational a processor module that is inserted into a computer system in accordance with an embodiment of the present invention.

FIG. 4 is a flow chart illustrating some of the operations involved in making operational a processor module that is inserted into a computer system in accordance with an embodiment of the present invention. By way of example, assume processor module 200 from FIG. 2 is to be inserted into the computer system.

The system begins in state 400 and proceeds to state 402. In state 402, the system detects a new processor module. In one embodiment, this detection involves receiving input from a computer system operator, either through a switch or a command entered into the computer system, that processor module 200 has been inserted into the computer system. In another embodiment, this detection is performed automatically by the computer system, either through some type of sensor or a mechanism that polls connector 202, to determine if processor module 200 is present in connector 202.

The system next proceeds to state 404. In state 404, controller 208 activates switch 206 to power up processor module 200. The system next proceeds to state 404. In state 404, controller 208 causes bus isolators 106 to electrically couple signal lines from processor module 200 to bus 126. The system next proceeds to state 408. In state 408, the system restores state to processor module 200 from wherever the state was stored from a previous processor module in connector 202. The system next proceeds to state 410. In state 410, the computer system's operating system is modified appropriately, so that computational tasks will be directed to processor module 200. The system next proceeds to state 412. In state 412, APIC 142 is reprogrammed so that processor module 200 will receive interrupts. The system then proceeds to state 414, which is an end state.

CONCLUSION

One embodiment of the present invention provides a method and an apparatus that allows a processor module to be removed from a computer system and replaced without shutting the computer system down. This allows failed processor modules to be replaced and processor modules to be upgraded, while the computer system continues to operate. Thus, the present invention can greatly improve computer system reliability.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method for preparing a computer system for removal of a processor module from the computer system while the computer system is operating, comprising:

receiving a command to prepare the computer system for removal of the processor module;

saving state from the processor module to a first location in the computer system;

modifying parameters of an operating system in the computer system so that the computer system will continue to function without the processor module; and removing power from the processor module while maintaining power to other parts of the computer system.

2. The method of claim 1, further comprising isolating electrical pathways between the processor module and the computer system.

3. The method of claim 1, further comprising modifying an interrupt structure in the computer system so that the processor module will not receive interrupts.

4. The method of claim 3, wherein modifying the interrupt structure includes modifying the interrupt structure so that interrupts are redirected to another processor in the computer system.

5. The method of claim 1, further comprising waiting for a bus transaction involving the processor module to complete.

6. The method of claim 5, further comprising waiting for a computational task involving the processor module to complete.

7. The method of claim 1, further comprising overwriting reboot code in the computer system with code that restores state from the first location in the computer system.

8. The method of claim 1, wherein receiving the command to prepare the computer system for removal of the processor module includes receiving the command from a switch.

9. The method of claim 1, wherein receiving the command to prepare the computer system for removal of the processor module includes receiving the command from a computer program.

10. The method of claim 1, wherein receiving the command to prepare the computer system for removal of the processor module includes receiving the command from a computer system resource that detects a problem in the processor module.

11. The method of claim 1, wherein saving state from the processor module to the first location in the computer system includes saving values stored in processor registers.

12. The method of claim 1, wherein saving state from the processor module to the first location in the computer system includes saving values from a processor cache on the processor module.

13. The method of claim 1, wherein saving state from the processor module to the first location in the computer system includes saving state from the processor module to another processor module in the computer system.

14. The method of claim 1, wherein saving state from the processor module to the first location in the computer system includes saving state from the processor module to a storage area in the computer system.

15. A method for configuring a computer system for removal of a processor module from the computer system while the computer system is operating, comprising:

receiving a command to prepare the computer system for removal of the processor module;

modifying parameters of an operating system in the computer system so that the computer system will continue to function without the processor module; and isolating electrical pathways between the processor module and the computer system; and removing power from the processor module while maintaining power to other parts of the computer system.

16. A method for configuring a computer system for removal of a processor module from the computer system while the computer system is operating, comprising:

receiving a command to prepare the computer system for removal of the processor module;

waiting for a transaction involving the processor module to complete;

saving state from the processor module to a first location in the computer system;

modifying parameters of an operating system in the computer system so that the computer system will continue to function without the processor module;

modifying an interrupt structure in the computer system so that the processor module will not receive interrupts;

isolating electrical pathways between the processor module and the computer system; and removing power from the processor module while maintaining power to other parts of the computer system.

17. A method for configuring a computer system for insertion of a processor module into the computer system while the computer system is operating comprising:

detecting insertion of the processor module in the computer system;

signaling the computer system to provide power to the processor module;

resetting the processor module;

modifying parameters of an operating system in the computer system so that the computer system will utilize the processor module; and signaling the computer system to deactivate isolators in signal lines between the processor module and the computer system.

18. A method for configuring a computer system for insertion of a processor module into the computer system while the computer system is operating, comprising:

detecting insertion of the processor module in the computer system;

signaling the computer system to provide power to the processor module;

resetting the processor module; and modifying parameters of an operating system in the computer system so that the computer system will utilize the processor module;

wherein detecting insertion of the processor module includes receiving an input from a computer system operator indicating that the processor module has been inserted into the computer system.

19. A method for configuring a computer system for insertion of a processor module into the computer system while the computer system is operating, comprising:

detecting insertion of the processor module in the computer system;

signaling the computer system to provide power to the processor module;

resetting the processor module; and modifying parameters of an operating system in the computer system so that the computer system will utilize the processor module;

wherein resetting the processor module includes restoring state to the processor module from a first location in the computer system.

* * * * *